US012232594B2

(12) United States Patent
Park et al.

(10) Patent No.: US 12,232,594 B2
(45) Date of Patent: Feb. 25, 2025

(54) COSMETIC INK APPLICATION DEVICE AND A METHOD OF APPLYING COSMETIC INK

(71) Applicant: L'OREAL, Paris (FR)

(72) Inventors: Woo Ram Park, Kawasaki (JP); Chin Kai Lee, Kawasaki (JP); Vishal Sharma, Kawasaki (JP)

(73) Assignee: L'Oreal, Paris (FR)

( * ) Notice: Subject to any disclaimer, the term of this patent is extended or adjusted under 35 U.S.C. 154(b) by 527 days.

(21) Appl. No.: 17/619,963

(22) PCT Filed: Jun. 19, 2020

(86) PCT No.: PCT/JP2020/025120
§ 371 (c)(1),
(2) Date: Dec. 16, 2021

(87) PCT Pub. No.: WO2020/256157
PCT Pub. Date: Dec. 24, 2020

(65) Prior Publication Data

US 2022/0354234 A1 Nov. 10, 2022

(30) Foreign Application Priority Data

Jun. 21, 2019 (JP) ................................ 2019-115671

(51) Int. Cl.
*B41J 3/407* (2006.01)
*A45D 34/04* (2006.01)
(Continued)

(52) U.S. Cl.
CPC ........... *A45D 44/005* (2013.01); *A45D 34/04* (2013.01); *B41J 3/4073* (2013.01); *B41J 11/008* (2013.01);
(Continued)

(58) Field of Classification Search
None
See application file for complete search history.

(56) References Cited

U.S. PATENT DOCUMENTS 5,556,612 A 9/1996 Anderson et al.
10,486,174 B2 * 11/2019 Edgar ...................... B41J 3/407
(Continued)

FOREIGN PATENT DOCUMENTS

CN 101657155 2/2010
CN 101810545 8/2010
(Continued)

OTHER PUBLICATIONS

Office Action for Japanese Application No. 2019-115671, mailed Jul. 3, 2023 (machine translation included).
(Continued)

*Primary Examiner* — Scott A Richmond
(74) *Attorney, Agent, or Firm* — CHRISTENSEN O'CONNOR JOHNSON KINDNESS PLLC

(57) ABSTRACT

The present invention relates to a cosmetic ink application device which functions by producing a region as an alignment marker on human skin and detecting the region to align an applicator with the skin, and a method thereof. A cosmetic ink application device according to the present invention comprises: a light source for irradiating human skin with ultraviolet light; an optical sensor for detecting intensities of fluorescence in a ultraviolet range and/or a visible light range emitted from the skin in response to the irradiation of the ultraviolet light; an applicator for applying a cosmetic ink to the skin; a head portion for holding the light source, the optical sensor, and the applicator; and a controller, wherein the controller defines a region on the skin, which emits fluorescence having an intensity different from fluorescence emitted from other regions of the skin when irradiated with the ultraviolet light, as a marker region,
(Continued)

wherein the controller determines a position of the ink application based on the marker region, and wherein the controller causes the applicator to apply the ink on a predetermined portion of the skin.

16 Claims, 5 Drawing Sheets

(51) Int. Cl.

| | |
|---|---|
| ***A45D 44/00*** | (2006.01) |
| ***B41J 11/00*** | (2006.01) |
| ***B41J 29/393*** | (2006.01) |
| ***B41M 5/00*** | (2006.01) |

(52) U.S. Cl.

CPC .......... *B41J 29/393* (2013.01); *B41M 5/0047* (2013.01); *B41M 5/0088* (2013.01); *A45D 2200/205* (2013.01)

(56) References Cited

U.S. PATENT DOCUMENTS

| | | | | |
|---|---|---|---|---|
| 2003/0108542 | A1 | 6/2003 | Pruche et al. | |
| 2008/0193195 | A1 | 8/2008 | Edgar et al. | |
| 2009/0025747 | A1 | 1/2009 | Edgar et al. | |
| 2012/0029417 | A1 | 2/2012 | Samain et al. | |
| 2016/0316891 | A1* | 11/2016 | Samain .................. | A61Q 1/025 |
| 2017/0018093 | A1 | 1/2017 | Kang et al. | |
| 2020/0376855 | A1 | 12/2020 | Lee et al. | |

FOREIGN PATENT DOCUMENTS

| | | | |
|---|---|---|---|
| CN | 101287607 | | 9/2010 |
| CN | 105744855 | | 7/2016 |
| CN | 109195481 | | 1/2019 |
| JP | A-H03-505872 | | 12/1991 |
| JP | A-2003-519019 | | 6/2003 |
| JP | A-2003-210248 | | 7/2003 |
| JP | A-2006-271654 | | 10/2006 |
| JP | 2006297691 | A | 11/2006 |
| JP | A-2013-019909 | | 1/2013 |
| JP | A-2015-159975 | | 9/2015 |
| JP | A-2019-005611 | | 1/2019 |
| KR | 10-2018-0048932 | | 5/2018 |
| KR | 10-2019-0008831 | | 1/2019 |
| WO | WO 89/12441 | | 12/1989 |
| WO | WO 01/49360 | | 7/2001 |
| WO | 2010004528 | A1 | 1/2010 |
| WO | 2010004531 | A1 | 1/2010 |
| WO | 2010095118 | A2 | 8/2010 |
| WO | 2017142136 | A1 | 8/2017 |
| WO | WO 2018/117022 | | 6/2018 |

OTHER PUBLICATIONS

Office Action for Application No. JP 2019-115671, mailed Dec. 25, 2023.

Office Action for Application No. CN202080045376, mailed Dec. 22, 2023.

Office Action for KR 10-2022-7000191, mailed Dec. 12, 2023.

International Search Report mailed Nov. 13, 2020, issued in corresponding International Application No. PCT/JP2020/025120, filed Jun. 19, 2020, 2 pages.

* cited by examiner

COSMETIC INK APPLICATION DEVICE AND A METHOD OF APPLYING COSMETIC INK

FIELD OF THE INVENTION

The present invention relates to a device for applying a cosmetic ink on human skin and a method of applying thereof.

BACKGROUND OF THE INVENTION

Although makeup has to be applied every day, the result of applying the makeup strongly depends on personal skill and therefore it is difficult to obtain a desirable result. Furthermore, since makeup has to be manually applied by looking at a face reflected in a mirror, the result of applying the makeup has poor reproducibility and the application takes a long time to finish. Therefore, a technology such as printing for automatically finishing makeup application in a short time, i.e., a device for applying a cosmetic ink (a cosmetic ink application device) has been anticipated.

Patent Publication 1 discloses a device for printing an image on human skin. This device comprises a printing portion such as an ink jet printer for executing a print on human skin based on an image chosen by a user. When the user assigns a start point or an origin by bringing the device into contact with the skin, the device tracks a portion of a body in a space on the printing portion to carry out printing on the skin.

Patent Publication 2 also discloses a device for printing an image on human skin. Before using this device, a user chooses an image to be printed on the skin. Then, the device irradiates the skin with white light and detects light reflected on the skin. The device determines the brightness and color of the skin based on the reflected light. Then, the device corrects the brightness and the color of the image to be printed on the skin based on the determined brightness and color of the skin such that a desirable appearance is obtained when the image is printed. Finally, the user brings a portion of their body into contact with the device, and the device prints the image on the skin.

The purpose of a conventional printing device, as shown in, for example, Patent Publications 1 and 2, is to print a desirable image on a portion such as an arm or a back of a hand of the user. Therefore, such a conventional device does not need a precise alignment when printing an image. When printing an image, a user manually aligns the device, such as by bringing the printing device into contact with the arm of the user.

However, when such a printing technology is applied to makeup on a face, a precise alignment is essential. For example, if a user applies the makeup to the eyebrows or lips of the user, the user cannot obtain a desirable result if the position is displaced, even by 1 mm. The printing device covers a portion of a body on which the image is intended to be printed. Therefore, even if the user tries to bring the printing device into contact with the desired portion while looking at a mirror, it is still very difficult to determine whether or not the user has successfully brought the printing device into contact with the correct portion. The biggest problem of a cosmetic ink application device for automatically applying makeup to human skin is to correctly define the region to which the makeup is to be applied.

Furthermore, regions to which makeup is applied, in general, vary very dynamically in terms of shape and stiffness. Therefore, the cosmetic ink application device needs to digitally or automatically track the application region in real time. Conventional printing devices cannot automatically align or correct the position with respect to the skin, and therefore cannot address the dynamic changes in the shape and stiffness of the skin.

PRIOR ART

Patent Publication 1: Japanese Unexamined Patent Application, Publication No. 2006-297691

Patent Publication 2: PCT International Publication No. 2017/142136

SUMMARY OF THE INVENTION

Technical Problem to be Solved

The present invention has been made considering such a technical problem and relates to a cosmetic ink application device by producing a region as an alignment marker on human skin and detecting the region to align an applicator to the skin, and a method of automatically applying a cosmetic ink.

Means for Solving the Problem

To solve the technical problem above, the present invention provides the following means:

A cosmetic ink application device according to the present invention comprises: a light source for irradiating human skin with ultraviolet light; an optical sensor for detecting intensities of fluorescence in a ultraviolet range and/or a visible light range emitted from the skin in response to the irradiation of the ultraviolet light; an applicator for applying a cosmetic ink on the skin; a head portion for holding the light source, the optical sensor, and the applicator; and a controller, wherein the controller defines a region on the skin which emits fluorescence having an intensity which differs from fluorescence emitted from other regions of the skin when irradiated with the ultraviolet light, as a marker region, wherein the controller determines a position for carrying out the ink application based on the marker region, and wherein the controller causes the applicator to apply the ink on a predetermined portion of the skin.

Such a cosmetic ink application device is able to precisely apply an ink on human skin and apply makeup desirably by aligning the applicator based on the marker region preliminarily formed on the skin and by applying the ink by tracking the marker region even if the skin is moved. Since the marker region is visually unrecognizable when irradiated with visible light, the marker region does not affect the appearance after the application of the ink.

The cosmetic ink application device according to the present application further comprises a guiding member for moveably supporting the head portion, wherein the controller locates the applicator based on the marker region.

Since such a cosmetic ink application device does not need to provide a moving mechanism on the head portion, or does not need to configure the head portion to cover the whole application region, the head portion may be miniaturized or simplified.

Regarding the cosmetic ink application device according to the present invention, the light source and the optical sensor are disposed in front of the applicator along a moving direction of the head portion.

Since such a cosmetic ink application device can track the marker region by the light source and the optical sensor, and immediately apply the ink, the device can precisely track the marker region and apply the ink.

Regarding the cosmetic ink application device according to the present invention, the applicator is any one of an ink jet printer head, a stamp, a brush, a roller, a pen, or a pencil.

Such a cosmetic ink application device can precisely apply the ink on a desired portion of a body with a desirable color, shape, and concentration.

Regarding the cosmetic ink application device according to the present invention, the controller causes the applicator to apply the ink after moving the applicator with respect to the marker region based on data regarding a color and/or a shape of a region for applying the ink, the data being stored in the controller or externally delivered.

Such a cosmetic ink application device can realize the makeup which the user desires by utilizing preliminarily stored data or externally delivered data.

A kit according to the present invention comprises: the cosmetic ink application device described above; and a marker agent, wherein a region of the skin, on which the marker agent is applied, forms the marker region.

Since such a kit can form the marker region which emits, the fluorescence suitable for the cosmetic ink application device, the kit can precisely align the applicator and apply the ink.

Regarding the kit according to the present invention, the marker agent, when applied on the skin, forms the marker region emitting the fluorescence having the intensity different from the intensity of the fluorescence emitted from the regions of the skin other than the marker region in response to the irradiation of the ultraviolet light.

Since the marker region formed by such a kit is visually unrecognizable when irradiated with visible light, the marker region does not affect the appearance after the application of the ink.

Regarding the kit according to the present invention, the marker region emits the fluorescence having the intensity larger than the intensity of the fluorescence emitted from the regions of the skin other than the marker region in response to the irradiation of the ultraviolet light.

An optical sensor of such a kit can easily identify the region emitting fluorescence having a high intensity on the skin as a marker region.

Regarding the kit according to the present invention, the marker agent is prepared such that the difference between the intensity of the fluorescence emitted from the marker region and the intensity of the fluorescence emitted from the regions of the skin other than the marker region reaches the threshold value or less after a predetermined time has elapsed from the application of the marker agent.

The user can form a new marker region by applying the marker agent of such a kit again when the difference between the intensity of the fluorescence emitted from the marker region and the intensity of the fluorescence emitted from the regions of the skin other than the marker region has reached the threshold value or less, and therefore the user can form a new marker region having a position and a size different from the prior marker position.

Regarding the kit according to the present invention, the marker agent includes at least one of dihydroxyacetone, Dansyl Chloride, Lawsone, Acetyl Tyrosine and Indigo, or dihydroxyacetone with erythrulose as an additive.

The marker region formed by the marker agent of such a kit can vanish without leaving any traces on human skin at least after a predetermined time has elapsed, and does not cause any adverse effects on the human body.

The kit according to the present invention further comprises a template or a stamp defining a shape of the marker region when applying the marker agent on the skin.

The user can easily form a marker region having a desirable position and shape by using the template or the stamp of such a kit when applying the marker agent on the skin.

A method according to the present invention comprises the steps of: irradiating human skin with ultraviolet light; detecting an intensity of fluorescence in an ultraviolet range and/or a visible range emitted from the skin; detecting a region emitting the fluorescence having the intensity different from the intensity of fluorescence emitted from other regions of the skin and defining the region as a marker region; and determining a portion of a body on which an ink is applied based on the position of the marker region and applying the ink, wherein the marker region emits fluorescence having an intensity different from the intensity of the fluorescence emitted from the regions of the skin other than the marker region when irradiated with the ultraviolet light.

Such a method can precisely apply the ink on human skin and apply makeup desirably by aligning the applicator based on the marker region preliminarily formed on the skin and by applying the ink by tracking the marker region even if the skin is moved. Since the marker region is visually unrecognizable when irradiated with visible light, the marker region does not affect the appearance after the application of the ink.

Regarding the method according to the present invention, the marker region emits fluorescence having a higher intensity than the intensity of the fluorescence emitted from the regions of the skin other than the marker region when irradiated with the ultraviolet light.

Such a method can easily identify the region on the skin emitting the fluorescence having a high intensity as the marker region.

Regarding the method according to the present invention, the step of determining the portion of the body to which the ink is applied and applying the ink comprises determining the portion to which the ink is applied, and applying the ink based on the position of the marker region and the data regarding the shape of the region to which the ink is applied.

According to such a method, the user can apply makeup desirably by choosing data defining the position and the shape of the region on which the ink is applied.

Regarding the method according to the present invention, the ink is applied by any one of an ink jet printing, a stamp, a brush, a roller, a pen, or a pencil.

According to such a method, the ink can be precisely applied at a desirable position with a desirable color, shape, and concentration.

The method according to the present invention further comprises a step of applying a marker agent on the skin before the step of irradiating the human skin with the ultraviolet light, wherein the marker agent forms the marker region.

According to such a method, the user can determine the desirable position and shape of the region to which the ink is applied.

Regarding the method according to the present invention, the marker agent is prepared such that a difference between the intensity of the fluorescence emitted from the marker region and the intensity of the fluorescence emitted from the regions of the skin other than the marker region in response to the irradiation of the ultraviolet light reaches the threshold value or less after a predetermined time has elapsed since the application of the marker agent.

According to such a method, the user can form a new marker region by applying the marker agent again when the difference between the intensity of the fluorescence emitted from the marker region and the intensity of the fluorescence emitted from the regions of the skin other than the marker region has reached the threshold value or less, and therefore, the user can form a new marker region having a position and a size different from the prior marker position.

Regarding the method according to the present invention, the marker agent includes at least one of dihydroxyacetone, Dansyl Chloride, Lawsone, Acetyl Tyrosine and Indigo, or dihydroxyacetone with erythrulose as an additive.

According to the method configured as above, the marker region formed by such marker agents can vanish without leaving any traces on the skin of the human at least after a predetermined time has elapsed, and therefore does not cause any adverse effects on the human body.

Regarding the method according to the present invention, in the step of applying the marker agent on the skin, the marker agent is applied on the skin by using a template or a stamp defining a shape of the marker region.

According to the method configured as above, the user can easily form the marker region having the desirable position and shape by using the template or the stamp when applying the marker agent.

Effect of Invention

Regarding the device, kit and method according to the present invention, a marker region for alignment on human skin is formed. The applicator can be easily aligned by detecting the marker region to automatically and precisely apply a cosmetic ink on the skin.

BRIEF DESCRIPTION OF DRAWINGS

FIG. 5(*b*) shows a menu displayed by an application for a mobile phone for choosing a shape of an eyebrow to be formed by applying the ink; FIG. 5(C) shows a state in which the cosmetic ink application device according to the present invention is applying the ink; and FIG. 5(*d*) shows a resultant state in which the ink has been applied.

EMBODIMENTS

Figure 1:
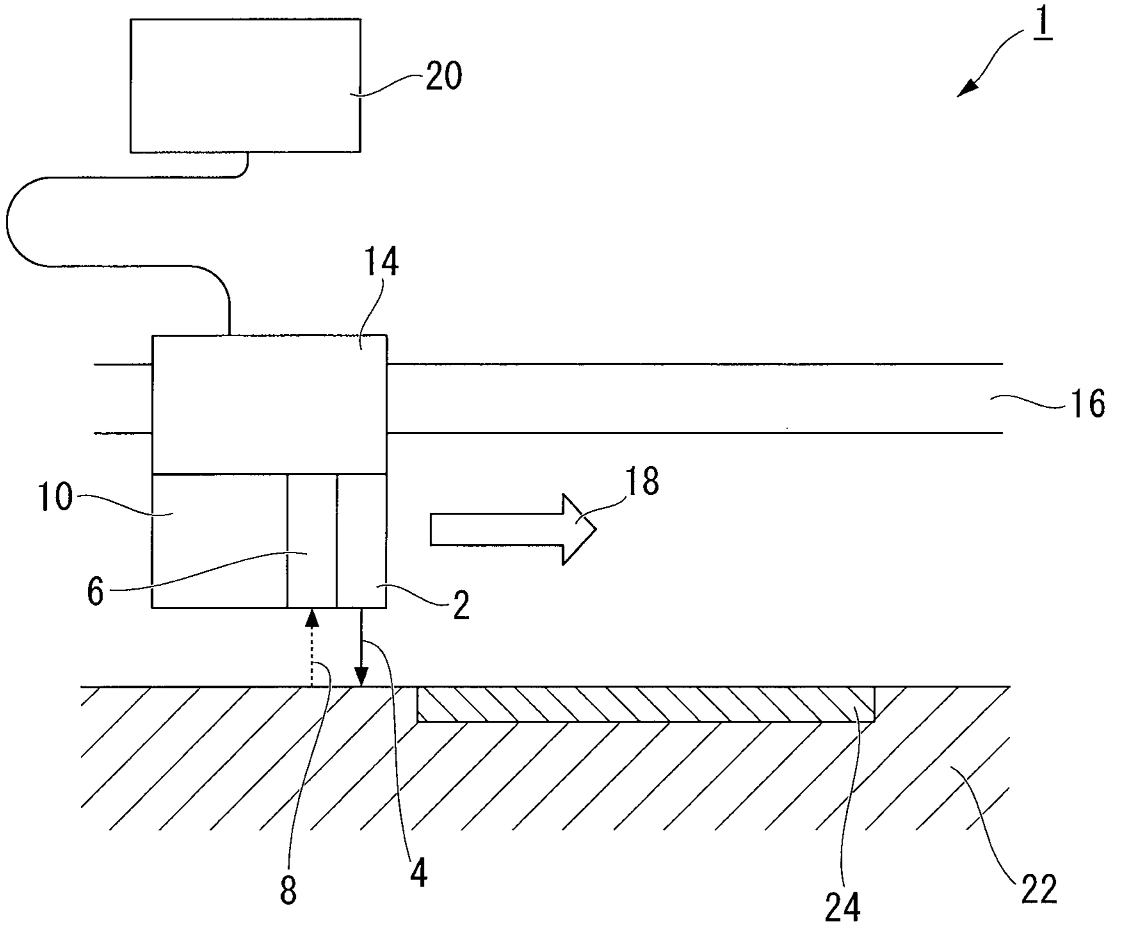
FIG. 1 is a side view of a cosmetic ink application device according to the present invention, showing a state in which the device does not apply the ink.
Figure 2:
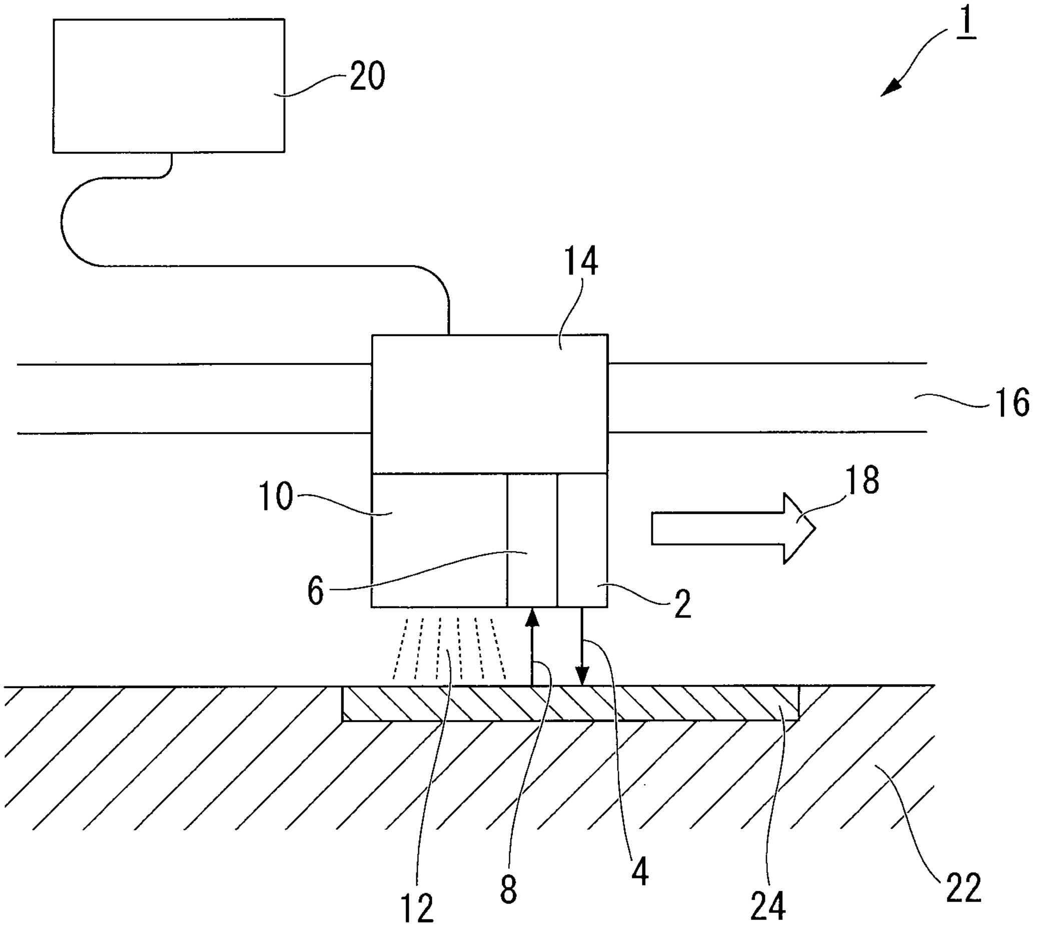
FIG. 2 is a side view of the cosmetic ink application device according to the present invention, showing a state in which the device is applying the ink.

Hereinafter, referring to FIGS. 1 and 2, an overview of a device for applying cosmetic ink, which is a cosmetic ink application device 1, according to the present invention, is described. FIG. 1 is a side view of the cosmetic ink application device 1 according to the present invention in a state in which the cosmetic ink application device 1 does not apply the ink, and FIG. 2 is a side view of the cosmetic ink application device 1 according to the present invention in a state in which the cosmetic ink application device 1 is applying the ink.

The cosmetic ink application device 1 according to the present invention comprises: a light source 2 for irradiating human skin 22 with ultraviolet light 4; an optical sensor 6 for detecting an intensity of fluorescence 8 in an ultraviolet range and/or a visible light range emitted from the skin 22 in response to the irradiation of the ultraviolet light 4; an applicator 10 for applying an ink 12 to the skin 22; a head portion 14 for holding the light source 2, the optical sensor 6, and the applicator 10; and a controller 20. The cosmetic ink application device 1 may further comprise a guiding member 16 for moveably supporting the head portion 14.

The controller 20 is electrically coupled with the light source 2, the optical sensor 6, the applicator 10, and the head portion 14 in order to transmit control signals to and/or receive signals from the light source 2, the optical sensor 6, the applicator 10, and the head portion 14.

A marker region 24 is provided on the skin 22. The marker region 24 emits fluorescence 8 having an intensity different from fluorescence emitted from other regions of the skin 22 when irradiated with the ultraviolet light 4. For example, the marker region 24 may emit the fluorescence 8 in an ultraviolet range and/or a visible light range having an intensity higher than the intensity of the fluorescence emitted from the regions of the skin 22 other than the marker region 24 when irradiated with the ultraviolet light. Alternatively, the marker region 24 may emit the fluorescence 8 having the intensity smaller than the intensity of the fluorescence emitted from the regions of the skin 22 other than the marker region 24 when irradiated with the ultraviolet light. Since the marker region 24 is formed on locations of the skin 22 such as a face, the marker region 24 may affect the appearance if the marker region 24 is visually recognizable under the visible light. Therefore, it is preferable that the marker region 24 is visually unrecognizable when irradiated with the visible light. The details of the marker region 24 are discussed later.

The cosmetic ink application device 1 is preferably small and lightweight for in-home use by a person, and is more preferably portable. The cosmetic ink application device 1 needs to precisely apply the ink 12 to a small region such as an eyebrow or a lip. Therefore, the light source 2, and the optical sensor 6 for detecting a region for applying the ink 12, and the applicator 10 for carrying out the application of the ink 12 are also preferably small.

The light source 2 may emit the ultraviolet light 4 in response to signals from the controller 20. The light source 2 may be a light source which can emit the ultraviolet light 4 such that the marker region 24 emits the fluorescence 8 when irradiated with the ultraviolet light 4. For example, an ultraviolet fluorescent lamp, a light emitting diode, and a laser may be employed as the light source 2. However, the light source 2 is preferably small, as discussed above. Furthermore, since strong ultraviolet light may cause damage, such as a sunburn, to human skin, the light source 2 preferably emits ultraviolet light having an intensity such that the light does not cause damage to human skin. Furthermore, the ultraviolet light preferably has a wavelength between 350 and 370 nm. As a small and low-power ultraviolet light source, for example, a light emitting diode may be chosen. However, if a laser is employed as the light source, the position of the marker region 24 can be very precisely determined.

The optical sensor 6 may be a sensor which can detect the fluorescence 8 in the ultraviolet range and/or the visible light range emitted from the marker region 24 in response to the ultraviolet light 4. For example, a photodiode, a CCD image sensor, and a CMOS image sensor may be employed as the optical sensor 6. The optical sensor 6 may detect light in an ultraviolet range and/or a visible light range and output signals depending on an intensity of light. The signals output from the optical sensor 6 are transmitted to the controller 20. When the intensity of the fluorescence 8 emitted from the skin and detected by the optical sensor 6 has varied, for example, to be over a predetermined threshold value, the controller 20 determines the region where the intensity of the fluorescence 8 has varied as a marker region 24.

The applicator 10 may apply an ink 12 in response to signals from the controller 20. Preferably, the applicator 10 precisely applies the ink 12, more preferably, a cosmetic ink such as an ink for eyebrows or a lipstick, on the skin 22. For example, an ink jet printer head such as a thermal ink jet printer head or a piezo ink jet printer head, a stamp, a brush, a roller, a pen, or a pencil can be employed as the applicator 10. The ink jet printer head ejects the ink 12 on the skin 22 in response to the application signals from the controller 20. Since the ink jet printer head can eject extremely fine droplets of an ink, the ink jet printer head can carry out precise application, for example, it can precisely draw an eyebrow. When a stamp, a roller, or a brush is employed as the applicator 10, the ink 12 is transfused in the stamp, the roller, or the brush. When a pen is employed as the applicator 10, the ink 12 is ejected from the tip of the pen via a conduit in the pen. When a pencil is employed as the applicator 10, the ink 12 may be provided as a tip of the pencil. When the ink 12 is applied, the stamp, the roller, the brush, the pen, or the pencil contacts the skin 22 and the ink 12 is applied on the skin 22 in response to the application signals from the controller 20.

The head portion 14 may hold the light source 2, the optical sensor 6, and the applicator 10 together. The optical sensor 6 may be disposed adjacent to the light source 2. In such a configuration, the optical sensor 6 can detect the fluorescence 8 emitted from the skin 22 in response to the ultraviolet light 4 from the light source 2 with high sensitivity. In this case, a light shielding plate (not shown) may be provided between the light source 2 and the optical sensor 6 in order to prevent the optical sensor 6 from directly receiving light emitted from the light source 2.

The applicator 10 may be disposed adjacent to the light source 2 and the optical sensor 6. In such a configuration, since the applicator 10 can apply the ink 12 close to the marker region 24 detected by the optical sensor 6, the region for applying the ink 12 can be precisely determined with respect to the marker region 24. In a configuration wherein the applicator 10 is disposed adjacent to the light source 2 and the optical sensor 6, and, specifically, in the case that the applicator 10 is an ink jet printer head, an ink shielding plate (not shown) may be provided in order to prevent the ejected ink 12 from adhering to the light source 2 and the optical sensor 6. In this case, the ink jet printer head is disposed on one side of the ink shielding plate, and the light source 2 and the optical sensor 6 are disposed on the other side of the ink shielding plate.

As described above, the cosmetic ink application device 1 may comprise a guiding member 16 which moveably supports the head portion 14, or may not comprise a guiding member 16.

If the cosmetic ink application device 1 is configured not to comprise the guiding member 16, for example, the application of the ink 12 can be carried out by manually moving the head portion 14 or entire the cosmetic ink application device 1. If the head portion 14 is configured to cover the whole ink application region, the application of the ink 12 can be carried out without moving the head portion 14. In this case, since the ink 12 can be applied on the whole ink application region at the same time, a time for the ink application can be shortened. In another example, the head portion 14 may comprise a moving mechanism.

If the cosmetic ink application device 1 comprises the guiding member 16, the head portion 14 may be automatically moved and the ink application may be carried out more precisely than by manually moving the head portion 14. In another example, the head portion 14 may not be configured to cover the whole ink application region, or may not comprise a moving mechanism. In this case, the head portion 14 may be miniaturized or simplified.

Hereinafter, as one example, the present invention will be explained based on a configuration in which the guiding member 16 moveably supports the head portion 14. Although FIGS. 1 and 2 show that the head portion 14 is moved in one moving direction (indicated with an arrow 18) along the guiding member 16, the head portion 14 can be preferably moved in at least two dimensions in order to apply the ink 12 in a desired region. Since the region of the skin for applying the ink 12, for example, an eyebrow, is a small region compared to the entire skin, for example, the entire face, the region for applying the ink 12 can be considered as a substantially flat surface. In this case, the guiding member 16 is preferably configured to allow the head portion 14 to move two-dimensionally in a plane parallel to the skin 22. When it is more desirable to more precisely apply the ink 12 on an eyebrow, or when the ink 12 is applied on a lip, an undulation of the region for applying the ink 12 cannot be ignored. Therefore, the guiding member 16 is preferably configured to allow the head portion 14 to move three-dimensionally. In order to realize such a three-dimensional movement, the guiding member 16 can be preliminarily formed in a curved shape (for example, a curved rail) corresponding to the curved surface of the skin 22. Alternatively, the guiding member 16 may have a mechanism such as an actuator allowing the head portion 14 to move perpendicularly to the skin 22.

A direction parallel to a longitudinal direction of an eyebrow and/or a lip is herein defined as a main direction 18. When the head portion 14 moves in the main direction 18, the light source 2 and the optical sensor 6 are preferably disposed in front of the applicator 10 along the main direction 18. In such a configuration, when the ink 12 is applied along the marker region 24, the head portion 14 can be moved such that the optical sensor 6 tracks the marker region and the applicator 10 applies the ink 12 on the skin immediately after the optical sensor 6. Therefore, the ink 12 can be precisely applied along the marker region 24 even if the skin 22 is moved.

For example, a linear motor, a stepping motor and wheels, a belt mechanism, a wire mechanism, and a screw mechanism may be employed as the guiding member 16.

The head portion 14 is moved along the guiding member 16 in response to the signals from the controller 20.

Hereinafter, the marker region 24 is explained. A user forms the marker region 24 on the skin of the user before applying the ink 12 by using the cosmetic ink application device 1.

A marker agent for forming the marker region 24 may include a fluorescent agent prepared to form, for example, a marker region visually unrecognizable when irradiated with visible light but emitting fluorescence when irradiated with ultraviolet light. When the marker region 24 is formed on the skin 22 with such a marker agent, the marker region 24 emits fluorescence 8 having an intensity higher than an intensity of fluorescence emitted from other regions of the skin 22 in response to the ultraviolet light 4 projected by the light source 2. The controller 20 monitors the intensity of the fluorescence detected by the optical sensor 6. When a difference between the intensity of the fluorescence emitted from one region of the skin 22 and the intensity of the fluorescence emitted from other regions of the skin 22 has reached a predetermined threshold value or larger, the controller 20 determines and defines the region having the higher intensity of the fluorescence detected by the optical sensor 6 as a marker region 24. If the controller cannot find regions where the difference between the intensity of the fluorescence 8 emitted from these regions and the intensity of the fluorescence from other regions is the predetermined threshold value or larger, the cosmetic ink application device 1 can stop the application of the ink 12 and abort the operation.

Then, the controller 20 applies the ink 12 based on the position of the marker region 24. In other words, the cosmetic ink application device 1 utilizes the marker region 24 as an alignment marker and determines the position for applying the ink 12. Since the marker region 24 formed by the marker agent discussed above is visually unrecognizable when irradiated with visible light, the marker region 24 does not affect the appearance and is preferable for the cosmetic application. The marker agent is removed from the skin 22 with time, and the marker region 24 gradually vanishes.

Figure 3:
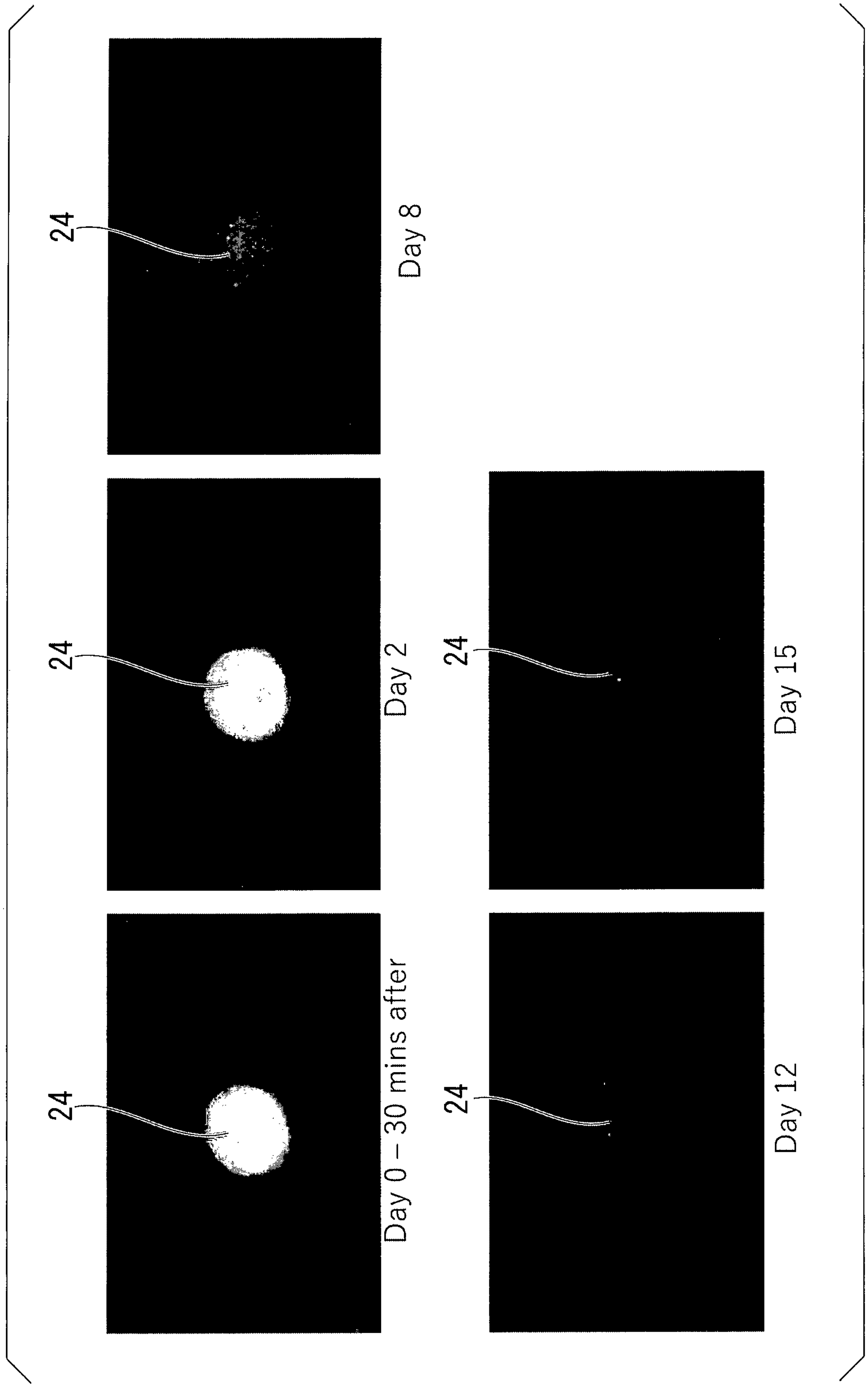
FIG. 3 is a diagram showing a time-dependent change of fluorescence emitted by a marker region formed on skin.

Alternatively, a marker agent may include dihydroxyacetone (DHA) prepared to form a marker region visually unrecognizable when irradiated with visual light but emitting fluorescence when irradiated with ultraviolet light. FIG. 3 shows images showing the temporal change of the fluorescence 8 emitted by the marker region 24 formed by applying the marker agent including the DHA on the skin 22 such that the marker region 24 is visually unrecognizable when irradiated with visible light but emits fluorescence when irradiated with ultraviolet light. The DHA is conventionally used as a "sunless tanning agent", turning the color of skin darker even without absorbing the sun. When the DHA of, for example, 1 to 20 weight % is applied on the skin, the DHA reacts with residues of amino acid to create a pigment referred to as melanoidin on the skin. The melanoidin remains on the skin, and appears with a color like a suntan for several days or even several weeks even if the residual DHA is removed. Furthermore, the melanoidin emits a strong fluorescence in response to the irradiation of the ultraviolet light. As shown in FIG. 3, the fluorescence remains for several days or even several weeks. Furthermore, the DHA does not adversely affect human health and is listed as a cosmetic ingredient by FDA (Food and Drug Administration). Therefore, the DHA is preferable for forming the marker region 24 when irradiated with visible light but emits strong fluorescence when irradiated with ultraviolet light. If the marker region 24 is visually recognized, the marker region 24 affects an appearance of the skin. If the DHA is used for forming the marker region 24, the DHA having a concentration lower than the concentration for sunless tanning, for example, less than 1 weight % is preferably used. The visual recognition of the marker region 24 is affected by, not only the concentration of the DHA, but also various factors such as a lapse time and a total amount of the DHA applied.

Alternatively, a marker agent may include at least one of Dansyl Chloride, Lawsone, Acetyl Tyrosine and Indigo instead of the DHA. Erythrulose also can be considered as an additive for a combination with DHA.

Alternatively, a marker agent may include a coating material which does not substantially or completely emit fluorescence when irradiated with ultraviolet light or which shields fluorescence. When the marker agent including such a coating material is applied on the skin 22, the intensity of the fluorescence emitted from the applied region is lower than the intensity of the fluorescence emitted from other regions. Therefore, if the controller 20 determines a region having an intensity of fluorescence lower than the fluorescence of other regions as a marker region 24, the marker agent discussed above is available.

Additionally, the marker agent may include a dilution agent, a thickening agent, an antiseptic agent, and other ingredients other than materials emitting strong fluorescence, materials substantially or completely not emitting fluorescence, and materials shielding fluorescence.

Figure 4:
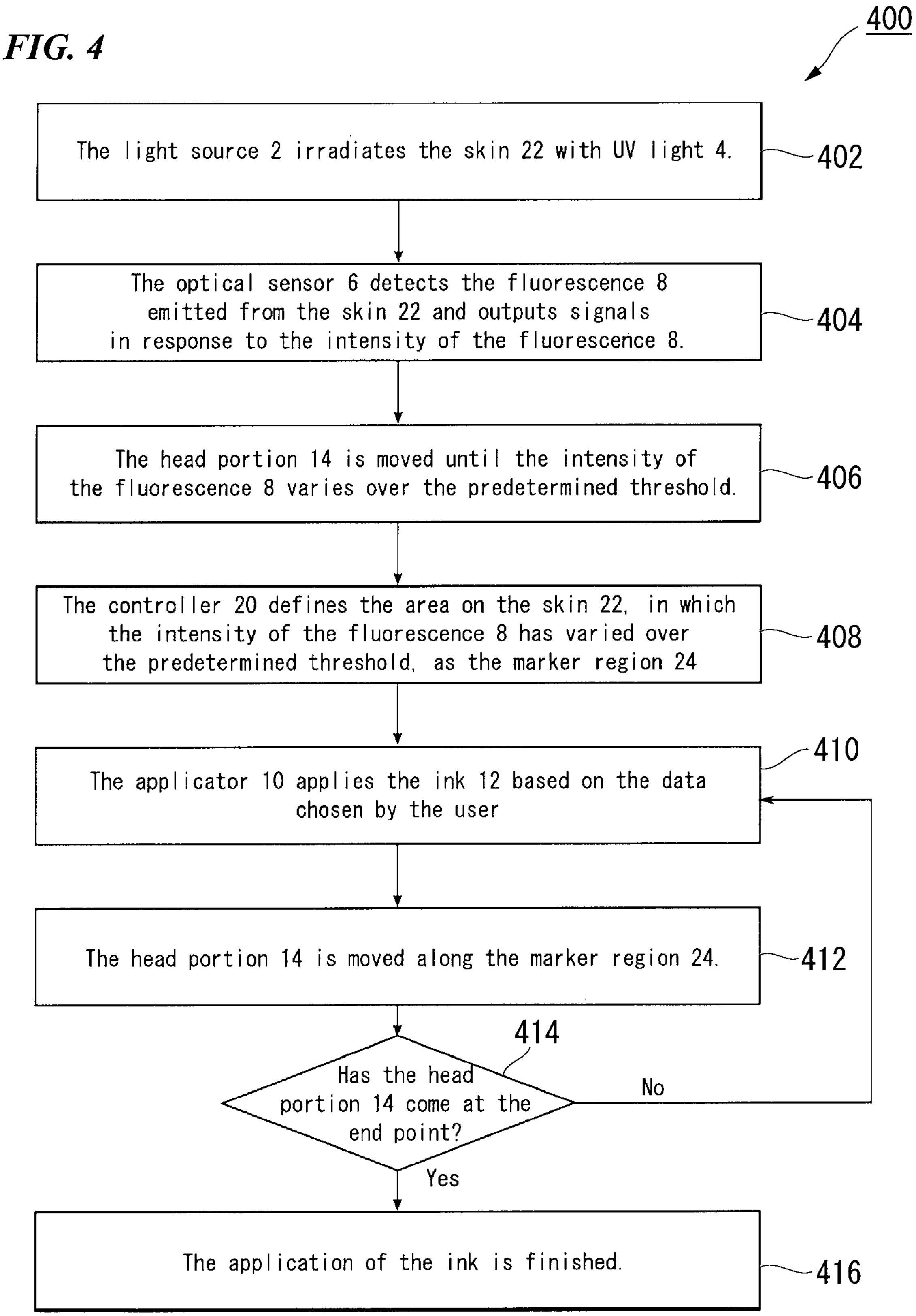
FIG. 4 is a flow diagram showing a method of applying the ink by the cosmetic ink application device according to the present invention.

Hereinafter, with reference to FIG. 4, a method 400 for applying the ink 12 to the skin 22 by the cosmetic ink application device 1 is described.

First, in step 402, the light source 2 irradiates the skin 22 with the ultraviolet light 4 in response to the signals from the controller 20. The skin 22 emits the fluorescence 8 in response to the irradiation of the ultraviolet light.

Next, in step 404, the optical sensor 6 detects the fluorescence 8 emitted from the skin 22 and outputs and transmits the signals depending on the intensity of the fluorescence 8 to the controller 20.

In step 406, the controller 20 moves the head portion 14 until the signals from the optical sensor 6, i.e., the intensity of the fluorescence 8, varies over a predetermined threshold value. If the controller 20 cannot find a region in which a difference between the intensity of the fluorescence 8 emitted from the region and the intensity of the fluorescence 8 emitted from other regions has reached the predetermined threshold value or larger, the cosmetic ink application device 1 can stop the application of the ink 12 and abort the operation.

In step 408, if the controller 20 finds a region where the intensity of the fluorescence 8 has varied over the predetermined threshold value, the controller 20 defines this region as a marker region 24.

In step 410, the applicator 10 applies the ink 12 on the skin 22 based on the data preliminarily chosen by the user regarding a shape, color, and concentration of a region for applying the ink, i.e., the shape, color, and concentration of the eyebrow, and based on the position of the marker region 24. In other words, the cosmetic ink application device 1 utilizes the marker region 24 as an alignment marker. The applicator 10 can adjust the color and the concentration of the ink 12 to be applied based on the data. The ink 12 may be applied to the marker region 24 and may be applied to a position offset by a predetermined distance from the marker region 24, as instructed by the data. When the ink 12 is applied to the position offset by the predetermined distance from the marker region 24, the shape of the region for applying the ink can be differentiated from the shape of the marker region 24 itself, and the options for the shape of the application region can be expanded. The ink 12 can be applied via printing technology including an ink jet printer such as a thermal ink jet printer and a piezo ink jet printer, a stamp, a roller, a brush, a pen, and a pencil.

In step 412, the head portion 14 is moved to the next application position based on the position of the marker region 24.

In step 414, the controller 20 determines whether or not the head portion 14 has come to the end point of the application, i.e., the end point of the marker region 24 based on the signals from the optical sensor 6. If the head portion 14 has not come to the end point of the marker region 24 yet, the method 400 returns to step 408 to apply the ink 12. If the head portion 14 has come to the end point of the marker region 24, the application of the ink 12 is finished in step 416. Repeating steps 410 to 414 until the head portion 14 comes to the end point of the marker region 24, the head portion 14 carries out the application of the ink 12 by tracking the marker region 24.

Hereinafter, referring to FIG. 5, a method in which a user uses the cosmetic ink application device 1 to apply an ink to an eyebrow is described.

Figure 5:
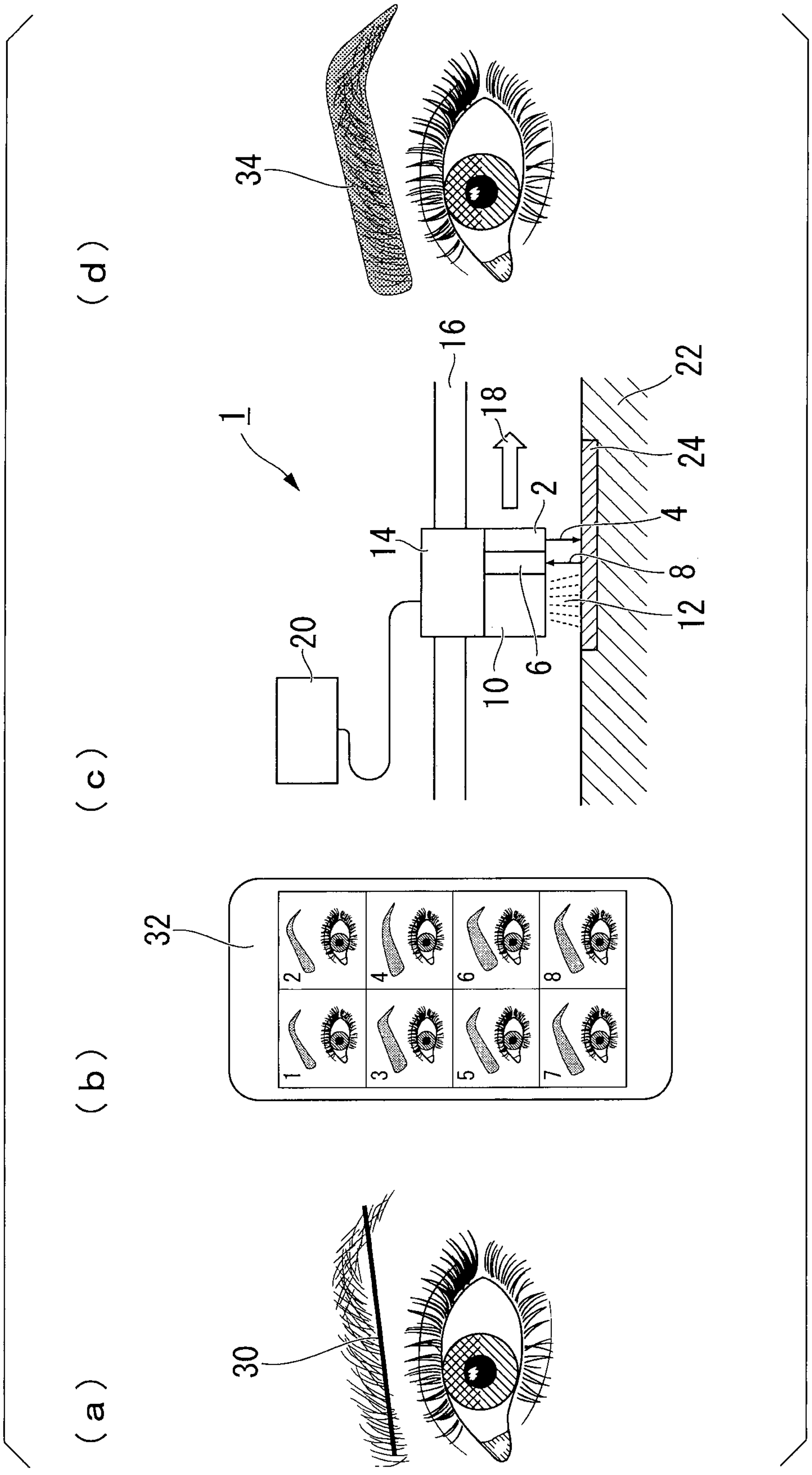
FIG. 5(*a*) shows a marker region formed on a position of an eyebrow.

As shown in FIG. 5(*a*), the user applies the marker agent to a region 30 for applying the ink 12 from the start point to the end point of the application of the ink. The user can apply the marker agent by using, for example, a roller, a brush, a pen, or a pencil. Alternatively, the user may use a template for defining the shape of the marker region with a through-recess such as a ruler or a stencil sheet in order to more precisely and more easily form the marker region 24 having a desirable shape. When using the template, the user brings the template into contact with a desirable position of the face of the user. Then, the user applies the marker agent on the face through the template by using a roller, a brush, a pen, or a pencil. Alternatively, the user may use a stamp having a desirable shape for the marker region 24 instead of the template. In this case, the user brings the stamp into contact with the marker agent at a desirable position of the face of the user to form the marker region 24. The marker agent used for forming the marker region may include at least one of dihydroxyacetone, Dansyl Chloride, Lawsone, Acetyl Tyrosine and Indigo as described above. Erythrulose also can be considered as an additive for a combination with dihydroxyacetone. The marker region 24 formed with such a marker agent is visually unrecognizable when irradiated with visible light but emits fluorescence having an intensity different from an intensity of fluorescence emitted from other regions of the skin 22 when irradiated with ultraviolet light. Therefore, even after applying the ink, the marker region 24 does not affect the appearance.

Then, as shown in FIG. 5(*b*), the user chooses a desirable shape of an eyebrow by using, for example, an application executed on a mobile phone 32 or a computer. The application of the mobile phone 32 transmits data corresponding to the chosen shape of the eyebrow to the controller 20 of the cosmetic ink application device 1 via wired or wireless communication. The data corresponding to the shape of the eyebrow may include information such as a position, a width, an angle, a length, a curvature, a color, a concentration, and a brightness of the eyebrow. The data may be preliminarily stored in the application, or stored on, for example, a server, and downloaded to the mobile phone via a network. The user may preliminarily or in real-time download the data from the server via a network.

Although FIG. 5(*b*) shows an example in which the user chooses a desirable shape of an eyebrow by using an application executable on a mobile phone, the user may use data stored in the cosmetic ink application device 1 instead of receiving data from an external device such as the mobile phone 32. In this case, the cosmetic ink application device 1 may comprise, for example, a data storing device, an input device receiving the user's input, and a display device showing the data to the user. The user can use the input device to choose a desirable shape from a menu read from the data storing device and displayed on the display device. The data may be preliminarily stored in the data storing device or stored on, for example, a server, and preliminarily or in real-time downloaded to the cosmetic ink application device 1 via a network.

Then, when the user brings the cosmetic ink application device 1 into contact with a region for applying the ink, for example, the face, the cosmetic ink application device 1 applies the ink as shown in FIG. 5(*c*), along with the method 400 discussed with reference to FIG. 4.

After the cosmetic ink application is finished, the eyebrow having the desirable shape is formed by the ink, as shown in FIG. 5(*d*).

An embodiment according to the present invention includes a kit comprising the cosmetic ink application device 1 and the marker agent discussed above. The kit may further include the template for applying the marker agent discussed above. The kit may further include the stamp discussed above for applying the marker agent.

The cosmetic ink application device 1, the kit, and the methods 400, 700 configured as above can form a marker region 24 which can be used as an alignment marker on human skin, detect the marker region 24 to easily locate the applicator 10, and automatically and precisely apply the cosmetic ink 12:

DESIGNATIONS

1: a cosmetic ink application device
2: a light source
4: ultraviolet light
6: an optical sensor
8: fluorescence
10: an applicator
12: an ink
14: a head portion
16: a guiding member
18: a moving direction of the head portion
20: a controller
22 skin
24, 24-1, and 24-2: a marker region
30: a region for applying the ink
32: a mobile phone
36: a start point
38: an end point
400 and 700: methods of applying the ink on the skin by the cosmetic ink application device

The invention claimed is:

1. A kit comprising:

a cosmetic ink application device; and a marker agent wherein a region of the skin to which the marker agent is applied forms the marker region, wherein the cosmetic ink application device comprises:

a light source for irradiating human skin with ultraviolet light;

an optical sensor for detecting intensities of fluorescence in an ultraviolet range and/or a visible light range emitted from the skin in response to the irradiation of the ultraviolet light;

an applicator for applying a cosmetic ink on the skin;

a head portion for holding the light source, the optical sensor, and the applicator; and a controller, wherein the controller:

defines a region on the skin which emits fluorescence having an intensity different from fluorescence emitted from other regions of the skin when irradiated with the ultraviolet light, as a marker region by moving the head portion parallel to a surface of the skin, determines a position for carrying out the ink application based on the marker region, and causes the applicator to apply the ink to a predetermined portion of the skin, and wherein the marker agent is prepared such that the difference between the intensity of the fluorescence emitted from the marker region and the intensity of the fluorescence emitted from the regions of the skin other than the marker region when irradiated with ultraviolet light reaches the threshold value or less after a predetermined time has elapsed from the application of the marker agent.

2. The kit according to claim 1, wherein the marker agent, when applied on the skin, forms the marker region emitting the fluorescence having an intensity different from the intensity of the fluorescence emitted from the regions of the skin other than the marker region in response to the irradiation of the ultraviolet light.

3. The kit according to claim 1, wherein the marker region emits the fluorescence having an intensity higher than the intensity of the fluorescence emitted from the regions of the skin other than the marker region in response to the irradiation of the ultraviolet light.

4. The kit according to claim 1, wherein the marker agent includes at least one of dihydroxyacetone, dihydroxyacetone, Dansyl Chloride, Lawsone, Acetyl Tyrosine and Indigo, or dihydroxyacetone with erythrulose as an additive.

5. The kit according to claim 1, further comprising a template or a stamp defining a shape of the marker region when applying the marker agent on the skin.

6. The kit according to claim 1, wherein the cosmetic ink application device further comprises a guiding member for moveably supporting the head portion, wherein the controller locates the applicator based on the marker region.

7. The kit according to claim 1, wherein the light source and the optical sensor are disposed in front of the applicator along a moving direction of the head portion.

8. The kit according to claim 1, wherein the applicator is any one of an ink jet printer head, a stamp, a brush, a roller, a pen, or a pencil.

9. The kit according to claim 1, wherein the controller causes the applicator to apply the ink after moving the applicator with respect to the marker region based on data regarding a color of a region, a shape of a region, or a combination thereof for applying the ink, the data being stored in the controller or externally delivered.

10. A method of using the kit of claim 1, comprising steps of:

irradiating human skin with ultraviolet light;

detecting an intensity of fluorescence in an ultraviolet range and/or a visible range emitted from the skin;

detecting a region emitting the fluorescence having the intensity different from an intensity of fluorescence emitted from other regions of the skin and defining the region as a marker region; and determining a portion on which an ink is applied, based on the position of the marker region by moving the head portion parallel to a surface of the skin, and applying the ink, wherein the head portion comprises an applicator for applying the ink, and wherein the marker region emits fluorescence having an intensity different from the intensity of the fluorescence emitted from the regions of the skin other than the marker region when irradiated with the ultraviolet light.

11. The method according to claim 10, wherein the marker region emits fluorescence having an intensity higher than the intensity of the fluorescence emitted from the regions of the skin other than the marker region when irradiated with the ultraviolet light.

12. The method according to claim 10, wherein the step of determining the portion to which the ink is applied and applying the ink comprises determining the portion to which the ink is applied and applying the ink based on the position of the marker region and the data regarding the shape of the region on which the ink is applied.

13. The method according to claim 10, wherein the ink is applied by any one of an ink jet printer, a stamp, a brush, a roller, a pen, or a pencil.

14. The method according to claim 10, further comprising a step of applying a marker agent on the skin before the step of irradiating human skin with the ultraviolet light, wherein the marker agent forms the marker region.

15. The method according to claim 14, wherein the marker agent includes at least one of dihydroxyacetone, dihydroxyacetone, Dansyl Chloride, Lawsone, Acetyl Tyrosine and Indigo, or dihydroxyacetone with erythrulose as an additive.

16. The method according to claim 14, wherein, in the step of applying the marker agent on the skin, the marker agent is applied on the skin by using a template or a stamp defining a shape of the marker region.

* * * * *